Sept. 24, 1957      B. N. TORELL      2,807,138
FUEL CONTROL FOR A SPLIT-TURBINE TYPE OF POWER PLANT
Filed July 5, 1952      2 Sheets-Sheet 1
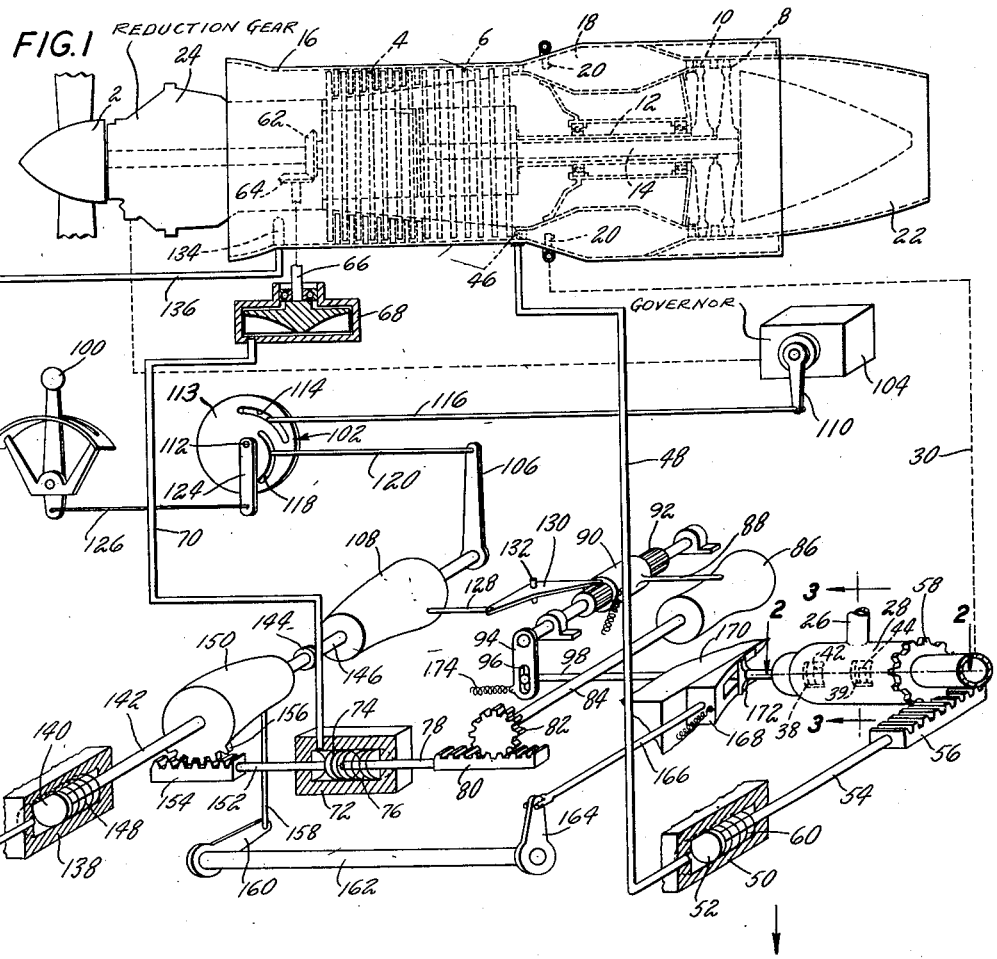
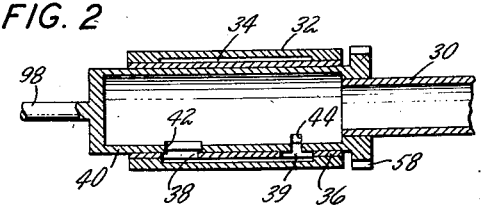
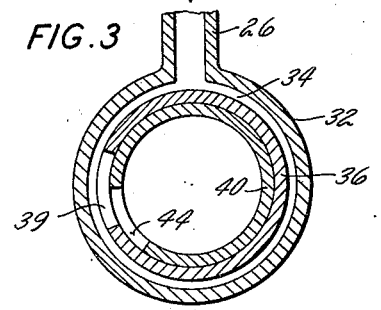
INVENTOR
BRUCE N. TORELL
BY Charles A. Warren
ATTORNEY Sept. 24, 1957 B. N. TORELL 2,807,138
FUEL CONTROL FOR A SPLIT-TURBINE TYPE OF POWER PLANT
Filed July 5, 1952 2 Sheets-Sheet 2
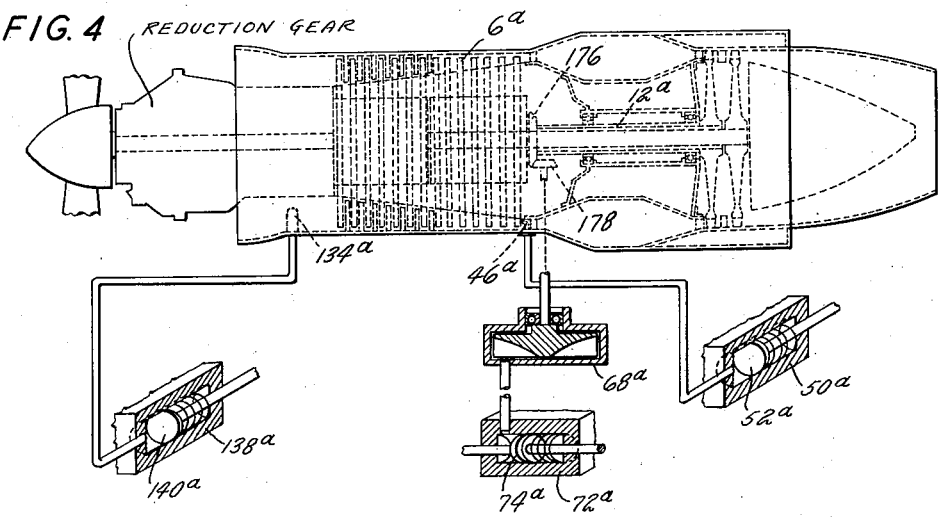
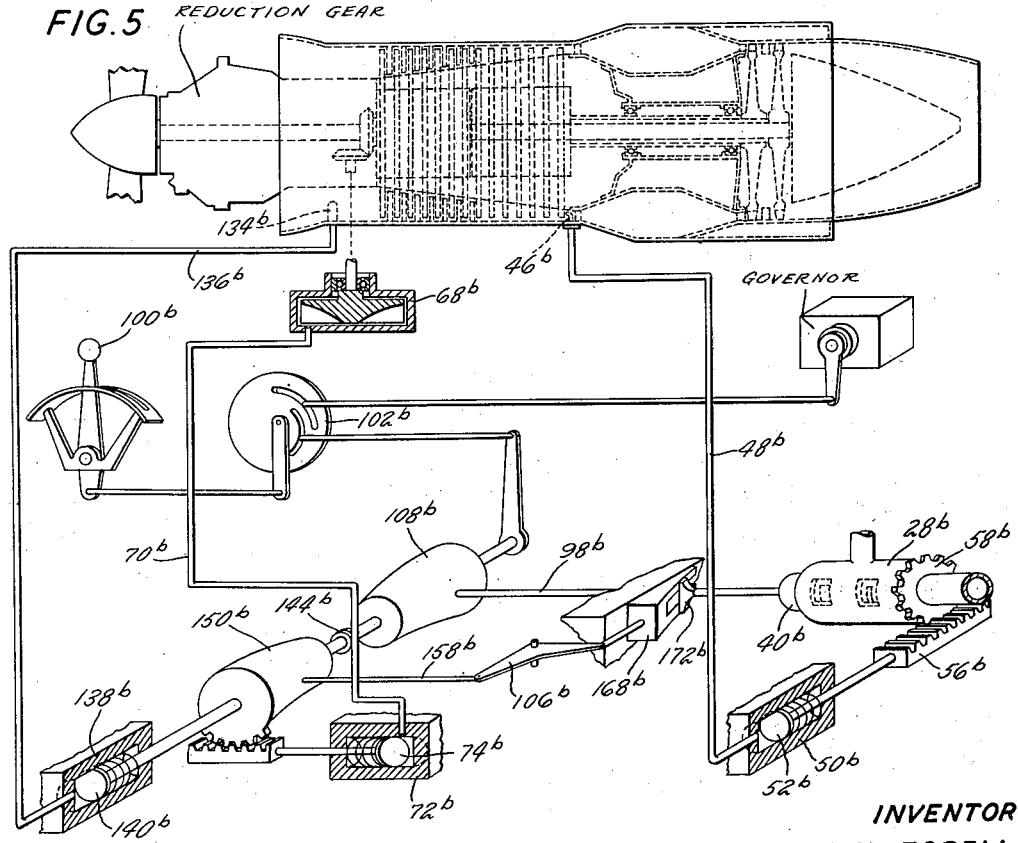
INVENTOR
BRUCE N. TORELL
BY Charles Warren
ATTORNEY

United States Patent Office 2,807,138
Patented Sept. 24, 1957

2,807,138

FUEL CONTROL FOR A SPLIT-TURBINE TYPE OF POWER PLANT

Bruce N. Torell, Wethersfield, Conn., assignor to United Aircraft Corporation, East Hartford, Conn., a corporation of Delaware Application July 5, 1952, Serial No. 297,313

8 Claims. (Cl. 60—39.16)

This invention relates to a control for a prop jet power plant, and particularly to a fuel control for a split-turbine type of power plant in which there are independently rotating low and high pressure rotors, one of which drives the propeller.

One feature of this invention is a fuel control by which to establish equilibrium fuel flow as a function of the temperature at a selected point in the compressor, the pressure at a selected point in the compressor and the power lever setting. With this arrangement the acceleration fuel flow is established as a function of temperature and pressure variations at selected points in the compressor and also as a function of the speed of one of the rotors.

Another feature is the further control of the equilibrium fuel flow, in addition to the variables above mentioned, in response to variations in speed of one of the rotors. One feature is the selection of the speed of the rotor not connected to the propeller as the variable by which to control both equilibrium fuel flow and acceleration fuel flow.

In a fuel control of the type having a metering valve including ported elements capable of rotational and translational movement with respect to each other to vary the effective port area, it has been found advantageous to control at least one movement of the metering valve by a three-dimensional cam. The cam is movable in two directions at right angles to each other so that the two variables can be utilized in combination for controlling the metering valve. With the use of rectangular or substantially rectangular cooperating ports it is therefore possible to regulate fuel flow through the metering valve as a function of two variables, acting through the three-dimensional cam, and as a function of one or more variables acting upon the metering valve in another sense.

Other objects and advantages will be apparent from the specification and claims, and from the accompanying drawing which illustrate an embodiment of the invention.

Fig. 1 is a diagrammatic view of the fuel control.

Fig. 2 is a sectional view through the control valve substantially along the line 2—2 of Fig. 1.

Fig. 3 is a sectional view of the valve substantially along the line 3—3 of Fig. 1.

Fig. 4 is a fragmentary view similar to Fig. 1 showing a modification.

Fig. 5 is a view similar to Fig. 1 showing a further modification.

The fuel control is intended for use in connection with gas turbine power plants and is shown in particular with a gas turbine power plant intended for driving a propeller 2 and having independently rotatable low and high pressure compressors 4 and 6 driven by separately rotatable low and high pressure turbines 8 and 10, respectively. In the arrangement shown the high pressure compressor 6 and high pressure turbine 10 are interconnected by a sleeve 12, and the low pressure compressor 4 and low pressure turbine 8 are connected by shaft 14 located within the sleeve. The low pressure compressor, the shaft 14 and the low pressure turbine constitute an inner spool which rotates independently of the outer spool which consists of the high pressure compressor 6, the sleeve 12 and the high pressure turbine 10.

Each of the compressors is shown as a multistage axial flow compressor with the low pressure compressor receiving air from an inlet 16 and discharging air directly to the high pressure compressor inlet. The high pressure compressor discharges air into the inlet end of a combustor 18 in which fuel from nozzles 20 is mixed with the air and burned. The discharge end of the combustor delivers the products of combustion to the high pressure turbine which in turn discharges the gas to the low pressure turbine. From the low pressure turbine the exhaust gas is discharged through a thrust nozzle 22. The low pressure turbine 8 in addition to driving the compressor 4 drives the propeller 2 through a reduction gear 24.

The fuel control includes a supply conduit 26 leading to a control valve 28. From this valve fuel is conveyed directly to the nozzles through a duct 30. The valve is so arranged as to control the flow of fuel to the combustor under all operating conditions of the power plant, and the valve is actuated as a function of power lever angle, compressor pressure, compressor temperature and rotor speed, as will be pointed out in detail.

The valve is shown in detail in Figs. 2 and 3 and includes a housing 32 having a groove 34 therein communicating with the inlet 26. A liner 36 fits within the casing and has axially spaced ports 38 and 39 through which fuel may pass from the groove 34. Within the liner 36 is the movable valve element 40 which has a rectangular port 42 adapted to cooperate with the similarly shaped port 38 and a narrow slot-like port 44 cooperating with the port 39. It will be noted that the element 40 may move a substantial distance axially without in any way closing the port 44. The element 40 is hollow and the space within the element communicates with the conduit 30 as shown.

The flow of fuel through the valve 28 is determined by the effective area of the combined ports 38 and 42, and also the combined ports 39 and 44. It will be apparent that rotary movement of the element 40 will vary the flow through both sets of ports, whereas axial movement of the element will effect only the combined ports 38 and 42.

The rotary movement of the element 40 in the arrangement shown is a function of a compressor pressure which is shown as the compressor discharge pressure. To this end a pressure tap 46 at the discharge end of the high pressure compressor is connected by a conduit 48 to the end of a cylinder 50. The latter has a piston 52 therein having a piston rod 54 to which a rack 56 is attached. The rack engages with gear teeth 58 on the valve element 40 so that movement of the piston 52 as a result of variations in compressor discharge pressure will cause turning motion of the element. A coil spring 60 acting on the piston 52 is so arranged that the motion of the piston 52 will be proportional to the variations in compressor discharge pressure.

The motion of the valve element 40 axially is a function of the speed of the low pressure compressor or the inner spool. To this end the low pressure compressor may carry a bevel gear 62 meshing with a gear 64 from which, through a shaft 66, a centrifugal pump 68 is driven. The periphery of this pump is connected by a conduit 70 to one end of a cylinder 72 in which a piston 74 is positioned. The piston is backed up by a spring 76 so that the motion of the piston 74 in the cylinder will be proportional to the pressure developed by the pump 68 which pressure in turn is a function of the speed of the compressor. The piston 72 carries a projecting rod 78 on which is mounted a rack 80 meshing with a pinion 82 on a shaft 84 on which a cam 86 is mounted. The cam 86 is a three-dimensional cam and is engaged by a finger 88 carried by a sleeve 90 on a splined shaft 92. The shaft 92 carries a projecting arm 94 having a slot 96 to receive the end of a rod 98 on the valve element 40. With this arrangement the axial motion of the valve element 40 may be proportioned to or may be a function of the speed of the low pressure compressor.

The position of the sleeve 90 on the splined shaft 92 is a function of the power lever angle and also a function of compressor inlet temperature. The power lever 100 is connected through a coordinator 102 to a propeller governor 104 and also to an arm 106 through which the position of the three-dimensional throttle cam 108 may be changed. The control coordinator is adapted to vary the setting of the propeller governor and also the angular position of the cam 108 in accordance with engine requirements and the motion of the arm 110 on the propeller governor is not of necessity directly proportional to the movement of the power lever or to the movement of the arm 106. The control coordinator may consist basically of a face cam 113 having a cam groove 114 to receive the end of a rod 116 connecting with the propeller governor arm 110. The cam may also have a second cam groove 118 to receive the end of rod 120 connected to the arm 106. The cam may be carried on a shaft 112 to which is attached an actuating arm 124 connected as by rod 126 to the power lever. With this arrangement it will be apparent that for a predetermined position of the power lever the three-dimensional cam 108 will also have a predetermined angular position.

Associated with the cam 108 is a follower rod 128 one end of which engages the cam and the other end of which engages a lever 130 having a fixed pivotal point 132. The other end of the lever engages the sleeve 90 such that movement of the cam 108 with respect to the follower rod 128 will cause a corresponding movement of the sleeve 90 axially on the shaft 92, and a corresponding movement of finger 88 on cam 86.

In addition to the turning movement of the cam 108 in response to a change in the position of the power lever, the cam 108 is shifted axially as a function of a compressor temperature, shown as the compressor inlet temperature. A temperature sensing element 134 located in the compressor inlet is connected by a duct 136 to the end of a cylinder 138 in which is located a piston 140. The piston rod 142 for this piston has mounted on the end thereof a coupling 144 which connects with the shaft 146 for the cam 108 in such a manner that the cam 108 will be moved axially with the piston 140 but will be free to turn independently of the piston rod 142. The piston 140 is backed up by a spring 148 so that the motion of the cam 108 in response to movement of the piston 140 will be proportional to temperature variations at the compressor inlet.

In addition to motion of the valve element 40 axially through the rod 98, the opening movement of the valve is limited to establish a maximum flow which is variable as a function of compressor inlet temperature and turbine speed. To accomplish this the piston rod 142, above referred to, carries a three-dimensional cam 150 the axial movement of which is proportional to compressor inlet temperature through the medium of the piston 140. This cam is rotated through a rod 152 projecting from the speed sensing piston 72 above referred to. The rod 152 carries a rack 154 engaging with gear teeth 156 on the cam 150.

Associated with the cam 150 is a follower rod 158 connected to an arm 160 on a rod 162. The rod carries another arm 164 having a connecting link 166 to a sliding cam 168 guided by a fixed support 170 and in a position to engage with a stop 172 on the rod 98. The rod 98 is normally urged to the left to hold the stop 172 against the cam 168, or, under steady state conditions, to hold the finger 88 against the cam 86. For this purpose a spring 174 may be connected to the end of the arm 94.

In the operation of an arrangement of this character the normal flow is determined by the quantity of fuel passing through both of the sets of ports. Under steady state conditions the stop 172 is away from the maximum-flow cam 168 and the quantity of fuel is determined as a function of power lever angle and compressor inlet temperature through the cam 108 and as a function of turbine speed through the cam 86. These three variables affect the axial position of the valve element 40 and the angular position of the sleeve is varied as a function of compressor discharge pressure. Since these ports 38 and 42 are both rectangular, the angular movement of the valve element will vary the flow as a direct function of compressor discharge pressure and the axial movement of the valve element will vary the flow as a function of the three variables, speed, compressor inlet temperature and power lever angle.

Under acceleration the position of the cams 108 and 86 will be such that the valve element 40 will tend to move to full open position except for the position of the cam 168 which, as above stated, is positioned as a function of compressor inlet temperature and turbine speed. With this arrangement, it is possible during power plant acceleration to prevent excessive temperature at the turbine inlet which might otherwise result with an excessive fuel flow.

During decelerating conditions the cams 108 and 86 will tend to move the valve element 40 so as to close completely or almost completely the main flow ports 38 and 42 so that minimum fuel flow during deceleration and under idling conditions will be determined by the axial dimension of the port 44 and the angular position of the valve element 40 which effects the circumferential dimension of the port 44. Since the angular position of the valve element is a function of compressor discharge pressure, it will be apparent that this variable controls minimum fuel flow.

The arrangement of Fig. 4 is very similar to that of Fig. 1 with the exception that the fuel flow is controlled as a function of the speed of the high pressure compressor rather than the speed of the low pressure compressor as in Fig. 1. To accomplish this the high pressure compressor 6a carries a bevel gear 176 on the sleeve 12a connected through a bevel pinion 178 to the centrifugal pump 68a. The compressor inlet temperature is sensed by a sensing device 134a as in Fig. 1 and acts through cylinder 138a and piston 140a. The speed is sensed from the pump 68a through cylinder 72a and piston 74a. Compressor discharge pressure is sensed from the pressure tap 46a by cylinder 50a and piston 52a. The mechanism is otherwise the same as that described in Fig. 1, and the operation is the same except that the high pressure compressor speed is sensed by the fuel control device.

The arrangement shown in Fig. 5 is a simplification of the controls of Figs. 1 and 4. In this arrangement the valve 28b is similar to the valve 28 and includes the sleeve 40b which is turned through a rack 56b and pinion 58b to vary the flow area through the sets of cooperating ports as in Fig. 1. The rack 56b is moved through a piston 52b in a cylinder 50b which is connected by a conduit 48b to a pressure tap 46b at the discharge end of the compressor.

The axial position of the sleeve 40b is under the control of a three-dimensional cam 108b the angular position of which is proportional to the angle of the power lever 100b as through a mechanism 102b in the manner above described in connection with Fig. 1. The axial position of the cam 108b is a function of compressor inlet temperature through the cylinder 138b and piston 140b, the former being connected by the tube 136b to a temperature sensing device 134b located in the compressor inlet. Accordingly, during normal operation of the power plant the axial position of the sleeve 40b is a function of power lever angle and compressor inlet temperature and the angular position is a function of compressor discharge pressure.

The movement of the sleeve 40b in a flow increasing direction is limited by means of a stop 172b on the projecting rod 98b from the sleeve. This stop engages with the cam surface 168b, the position of which is varied from a three-dimensional cam 150b through a rod 158b and a lever 160b. The axial position of the cam 150b is determined by the compressor inlet temperature since the cam 150b is moved axially with the cam 108b. The angular position of the cam 150b is a function of the speed of the low pressure compressor as determined by the pump 68b, the discharge pressure of which is transmitted through the pipe 70b to the cylinder 72b and piston 76b. It will be apparent that the coupling 144b permits relative rotation of the cams 108b and 150b.

With this arrangement the axial position of the sleeve 40b is limited during transient conditions as a function of compressor inlet temperature and the speed of one of the compressors. With this arrangement it is possible to limit the flow of fuel during acceleration of the power plant so that the permissible turbine inlet temperature will not be exceeded.

It is to be understood that the invention is not limited to the specific embodiment herein illustrated and described, but may be used in other ways without departure from its spirit as defined by the following claims.

I claim:

1. A fuel control for a gas turbine power plant having low and high pressure compressors and low and high pressure turbines, one of said compressors being connected to one of the turbines and the other compressor being connected to the other turbine, said fuel control including a supply of fuel under pressure, at least one fuel nozzle for delivering fuel to the power plant, a conduit from said supply to said nozzle, and a valve in said conduit, said valve including a sleeve having spaced ports and a member having spaced ports cooperating with the ports in the sleeve, a power lever, said sleeve being movable in axial and angular directions with respect to said member, means for moving said sleeve in one of said directions to vary the effective area of the ports in response to changes in the position of the power lever and in response to variations in the speed of one of the turbines, and means for limiting the movement of the sleeve in said one direction in response to variations in compressor inlet temperature and turbine speed.

2. A fuel control for a gas turbine power plant having low and high pressure compressors, low and high pressure turbines, and a propeller, one of said compressors being connected to one of the turbines, the other compressor, the other turbine and the propeller being interconnected, said fuel control including a supply of fuel under pressure, at least one fuel nozzle for delivering fuel to the power plant, a conduit from said supply to said nozzle, and a valve in said conduit, said valve including a sleeve having spaced ports and a member having spaced ports cooperating with the ports in the sleeve, a power lever, said sleeve being movable in axial and angular directions with respect to said member, means for moving said sleeve in one of said directions to vary the effective area of the ports in response to changes in the position of the power lever and in response to variations in the speed of the turbine connected to the propeller, and means for limiting the movement of the sleeve in said one direction in response to variations in compressor inlet temperature.

3. A fuel control for a gas turbine power plant having low and high pressure compressors and low and high pressure turbines, one of said compressors being connected to one of the turbines and the other compressor being connected to the other turbine, said fuel control including a supply of fuel under pressure, at least one fuel nozzle for delivering fuel to the power plant, a conduit from said supply to said nozzle, and a valve in said conduit, said valve including a sleeve having spaced ports and a member having spaced ports cooperating with the ports in the sleeve, a power lever, said sleeve being movable in axial and angular directions with respect to said member, means for moving said sleeve in one of said directions to vary the effective area of the ports in response to changes in the position of the power lever and in response to variations in the speed of one of the turbines and in response to variations in the temperature at a selected point in the compressor, and means for limiting the movement of the sleeve in said one direction in response to variations in compressor inlet temperature and the speed of one of the turbines.

4. A fuel control for a gas turbine power plant having low and high pressure compressors and low and high pressure turbines, one of said compressors being connected to one of the turbines and the other compressor being connected to the other turbine, said fuel control including a supply of fuel under pressure, at least one fuel nozzle for delivering fuel to the power plant, a conduit from said supply to said nozzle, and a valve in said conduit, said valve including a sleeve having spaced ports and a member having spaced ports cooperating with the ports in the sleeve, a power lever, said sleeve being movable in axial and angular directions with respect to said member, means for moving said sleeve in one of said directions to vary the effective area of the ports in response to changes in the position of the power lever and in response to variations in the speed of one of the turbines and in response to variations in the temperature at a selected point in the compressor, means for moving the sleeve in the other of said directions as a function of compressor discharge pressure, and means for limiting the movement of the sleeve in said one direction.

5. A fuel control for a gas turbine power plant having high and low pressure compressors and high and low pressure turbines, said high pressure compressor and turbine being interconnected and said low pressure compressor and turbine being interconnected, said fuel control including a supply of fuel under pressure, at least one fuel nozzle, a conduit from said supply to said nozzle, and a valve in said conduit, said valve including a sleeve having spaced ports and a member having spaced ports cooperating with the ports in the sleeve, one of said sets of ports operating to meter the flow during deceleration and idling, and the other set of ports metering flow under other conditions, a power lever, means for moving said sleeve axially with respect to said member to vary the effective area of said other set of ports in response to variations in compressor inlet temperature and in response to variations in the speed of one of the turbines and in response to changes in the position of the power lever, means for moving the sleeve angularly as a function of compressor discharge pressure, and means for limiting the movement of the sleeve axially in a flow increasing direction in response to variations in compressor inlet temperature and the speed of one of said turbines.

6. A fuel control for a gas turbine power plant having high and low pressure compressors and high and low pressure turbines, said high pressure compressor and turbine being interconnected and said low pressure compressor and turbine being interconnected, said fuel control including a supply of fuel under pressure, at least one fuel nozzle, a conduit from said supply to said nozzle, and a valve in said conduit, said valve including a sleeve having spaced ports and a member having spaced ports cooperating with the ports in the sleeve, one of said sets of ports operating to meter the flow during deceleration and idling, and the other set of ports metering flow under other conditions, a power lever, means for moving said sleeve axially with respect to said member to vary the effective area of said other set of ports in response to variations in compressor inlet temperature and in response to variations in the speed of the high pressure turbine and in response to changes in the position of the power lever, means for moving the sleeve angularly as a function of compressor discharge pressure, and means for limiting the movement of the sleeve axially in a flow increasing direction in response to variations in compressor inlet temperature and in response to the speed of one of said turbines.

7. A fuel control for a gas turbine power plant having low and high pressure turbines, a compressor connected to one of the turbines and power absorbing means connected to the other turbine, a power lever connected to said fuel control, said fuel control including a supply of fuel under pressure, at least one fuel nozzle through which fuel is delivered to the power plant, a conduit from said supply to said nozzle, and valve means in said conduit for regulating the flow of fuel therethrough, said valve means including a sleeve and a member, said sleeve and said member having at least one set of cooperating ports, said sleeve being movable in axial and angular directions with respect to said member for varying the effective area of said cooperating ports, means for moving said sleeve in response to changes in power lever position, in response to variations in compressor inlet temperature and in response to pressure variations at a selected point in the compressor, and means for limiting the movement of the sleeve as a function of said temperature and as a function of the speed of one of said turbines.

8. A fuel control for a gas turbine power plant having low and high pressure turbines, a compressor connected to one of the turbines and power absorbing means connected to the other turbine, a power lever connected to said fuel control, said fuel control including a supply of fuel under pressure, at least one fuel nozzle through which fuel is delivered to the power plant, a conduit from said supply to said nozzle, and valve means in said conduit for regulating the flow of fuel therethrough, said valve means including a sleeve and a member, said sleeve and said member having at least one set of cooperating ports, said sleeve being movable in axial and angular directions with respect to said member for varying the effective area of said cooperating ports, means for moving said sleeve in response to changes in power lever position, in response to variations in compressor inlet temperature, in response to variations in the speed of one of said turbines and in response to pressure variations at a selected point in the compressor, and means for limiting the movement of the sleeve as a function of said temperature and as a function of the speed of one of said turbines.

References Cited in the file of this patent

UNITED STATES PATENTS

| | | |
|---|---|---|
| 2,422,808 | Stoker | June 24, 1947 |
| 2,503,048 | Ifield | Apr. 4, 1950 |
| 2,593,536 | Chamberlin et al. | Apr. 22, 1952 |
| 2,670,599 | Davies et al. | Mar. 2, 1954 |